United States Patent
Simeral et al.

(10) Patent No.: US 7,966,468 B1
(45) Date of Patent: Jun. 21, 2011

(54) APPARATUS, SYSTEM, AND METHOD FOR FAST READ REQUEST TRANSFER THROUGH CLOCK DOMAINS

(75) Inventors: Brad W. Simeral, San Francisco, CA (US); Roman Surgutchik, Santa Clara, CA (US); Joshua Titus, Sunnyvale, CA (US); Anand Srinivasan, San Jose, CA (US); Edward M. Veeser, Austin, TX (US); James P. Reilley, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 374 days.

(21) Appl. No.: 11/012,034

(22) Filed: Dec. 13, 2004

(51) Int. Cl.
*G06F 1/00* (2006.01)
*G06F 1/12* (2006.01)
*G06F 13/42* (2006.01)

(52) U.S. Cl. ........ 711/167; 710/100; 710/305; 710/306; 710/315; 713/400; 713/401

(58) Field of Classification Search .................. 711/167; 710/100, 305, 306, 315; 713/400, 401
See application file for complete search history.

(56) References Cited

U.S. PATENT DOCUMENTS

| | | | | | |
|---|---|---|---|---|---|
| 4,745,310 | A | * | 5/1988 | Swapp | 327/279 |
| 5,465,340 | A | * | 11/1995 | Creedon et al. | 710/26 |
| 5,500,950 | A | * | 3/1996 | Becker et al. | 711/118 |
| 5,828,871 | A | * | 10/1998 | Kawaguchi et al. | 713/600 |
| 6,009,533 | A | * | 12/1999 | Zick | 713/501 |
| 6,025,744 | A | * | 2/2000 | Bertolet et al. | 327/276 |
| 6,052,775 | A | * | 4/2000 | Panwar et al. | 712/215 |
| 6,055,285 | A | * | 4/2000 | Alston | 375/372 |
| 6,345,328 | B1 | * | 2/2002 | Rozario et al. | 710/52 |
| 6,466,825 | B1 | * | 10/2002 | Wang et al. | 700/5 |
| 6,728,909 | B1 | * | 4/2004 | Bunton et al. | 714/49 |
| 6,961,847 | B2 | * | 11/2005 | Davies et al. | 712/235 |
| 7,441,087 | B2 | * | 10/2008 | Hakura et al. | 711/137 |
| 7,779,211 | B2 | * | 8/2010 | Quach | 711/146 |
| 2009/0193281 | A1 | * | 7/2009 | Blaner et al. | 713/500 |
| 2009/0193283 | A1 | * | 7/2009 | Blaner et al. | 713/600 |

OTHER PUBLICATIONS

Cadence Design Systems, Inc. Clock Domain Crossing. May 2004. Archive.org date of Oct. 21, 2004. http://cadence.com/whitepapers/cdc_wp.pdf.*
Parker, Roy H. Caution Clock Cross, a prescription for uncontaminated data across clock domains. Jul. 2004. Chip Design Magazine. http://www.chipdesignmag.com/display.php?articleId=32&issueId=5.*
Crews, Michael and Yong Yuenyongsgool. Practical design for transferring signals between clock domains. EDN. Feb. 20, 2003.*
Stein, Mike. Crossing the abyss: asynchronous signals in a synchronous world. EDN. Jul. 24, 2003.*

(Continued)

*Primary Examiner* — Yong Choe
*Assistant Examiner* — Samuel Dillon
(74) *Attorney, Agent, or Firm* — Cooley LLP

(57) ABSTRACT

A speculative transfer mechanism transfers a source synchronous read request from a first clock domain to a second clock domain. The address portion having address information is transferred to the second clock domain in response to detecting a source synchronous address strobe latching signal. A pointer is generated in response to detecting the address strobe latching signal and passed into the second clock domain. In one embodiment, a pointer is retimed to be stable for a timing window for which a crossover of the address portion may be performed in the second clock domain. Request logic in the second clock domain generates a read command based on the address portion and the pointer.

19 Claims, 8 Drawing Sheets

OTHER PUBLICATIONS

Sakamoto, et al. A digitally programmable delay chip with picosecond resolution. Bipolar Circuits and Technology Meeting, 1989., Proceedings of the 1989, vol., Iss., Sep. 18-19, 1989. pp. 295-297.*

Nowick et al. Speculative Completion for the Design of High-Performance Asynchronous Dynamic Adders. IEEE Async-97 Symposium. 3rd IEEE Int. Symp. on Advanced Research in Asynchronous Circuits and Systems. 1997.*

Tom Shanley, The Unabridged Pentium 4: IA32 Processor Genealogy, MindShare, Inc.., Chapters 44-55, (2004).

* cited by examiner

APPARATUS, SYSTEM, AND METHOD FOR FAST READ REQUEST TRANSFER THROUGH CLOCK DOMAINS

FIELD OF THE INVENTION

The present invention is generally related to transferring a read request from a source clock domain to a destination clock domain. More particularly, the present invention is directed towards transferring a read request that is compliant with a source synchronous protocol.

BACKGROUND OF THE INVENTION

System controller chips, sometimes known as "North Bridge" chips, are used to interface a memory with a central processing unit (CPU) and other components, such as a graphics processing unit (GPU). The North Bridge chipset architecture is a well-known architecture to interface a CPU, memory, and other components using a dedicated North Bridge chip and corresponding South Bridge chip. Recently, however, the functionality of North Bridge chips has been expanded. For example, the function of a North Bridge chip can be included within chips providing other functions. Some references use the term "system controller" to denote a more generic application of the function conventionally provided by a North Bridge chip. Consequently, as used in this application, a system controller is a controller that provides at least the function of a North Bridge chip in regards to interfacing a CPU and a memory.

A North Bridge chip typically utilizes a bus protocol to receive read requests from a CPU. One example of a bus protocol is the front side bus (FSB) protocol used in a variety of products manufactured by the Intel Corporation. An exemplary FSB protocol is described in the book by Tom Shanley, *The Unabridged Pentium 4: IA32 Processor Genealogy*, MindShare, Inc. (2004), the contents of which are hereby incorporated by reference. FSB protocols typically include a sequence of transaction phases that proceed in a predefined order, such as an arbitration phase, request phase, error phase, snoop phase, response phase, and data phase.

A source-synchronous system uses a strobe or clock signal to latch or clock the address and data signals at the receiving agent. Thus, in a source-synchronous system a receiver readies itself for data transfer based on a synchronizing parameter, such as a strobe signal, provided by the signal transmitter. For example, the Pentium 4™ microprocessor, manufactured by the Intel Corporation, is designed to work with a source synchronous FSB protocol and achieve two address data transfers for each complete bus clock (BCLK). Address bus signals define an address space. In a first subphase (sometimes known as the A packet), the address of the transaction is transmitted. In a second subphase (sometimes known as the B packet), transaction type information is transmitted. Request bus signals define a currently active transaction type. An ADS# address strobe indicates the validity of a transaction on the address and request buses. An address strobe ADSTB# is sent at a half wavelength offset from the bus clock. The ADSTB# signal is used to latch the first subphase of an address and a request on a first (falling) edge of ADSTB# and latch the second subphase on a second (rising) edge. Note that a "#" symbol indicates an inversion of a signal.

In a North Bridge chip a read request is typically transferred from the clock domain of a host interface (e.g., a clock domain operating at a bus clock rate or integer multiple thereof) to the memory clock domain of a memory controller. There can be a significant time delay to transfer the read request into the memory clock domain. This is because in a conventional process all of the read request signals must be first synchronized into synchronous bus clock domains by observing the synchronous ADS# signal, and after that synchronized into the memory clock domain, which can introduce a delay of several clocks, depending upon the speed of the transfer circuit and the number of clock cycles that it takes to find a crossover point where the request signals can be transferred into the memory clock domain. This transfer delay is undesirable because it delays the data return for which the CPU is waiting before the operation is complete.

Therefore, what is desired is an improved system, apparatus, and method for a fast data request memory controller.

SUMMARY OF THE INVENTION

A speculative transfer mechanism transfers source synchronous read requests from a source synchronous clock domain to a destination clock domain. A first address portion having address information is passed into the destination clock domain. A write pointer is generated from an address strobe latching signal. The write pointer indicates that a request has been received and is timed/retimed to provide timing information for crossing over the first address portion into the destination clock domain.

One embodiment of an apparatus is for transferring a read request from a first clock domain to a second clock domain. The read request is compliant with a source synchronous read request protocol providing that the read request includes an address portion representing an address and a source synchronous address strobe latching signal having a latching edge for latching the address portion. The apparatus includes a latch configured to latch the address portion from the first clock domain into the second clock domain in response to the latching edge of the address strobe latching signal. A pointer generator in the first clock domain generates a pointer in response to detecting the latching edge of the address strobe latching signal. The pointer provides timing information for crossing over the address portion into the second clock domain. Request logic in the second clock domain is configured to generate a read command to a memory responsive to the address portion and the pointer.

One embodiment of a system includes a bus interface unit to receive read requests from a central processing unit according to a source synchronous bus protocol. The protocol specifies that each read request includes a sequence of signals including an address portion specifying an address, an address strobe validating the address portion, and an address strobe latching signal including a latching edge for latching the address portion. A transfer module is configured to transfer the read request from a source synchronous clock domain associated with the bus interface unit to a destination clock domain associated with a memory controller. The transfer module latches the address portion in the source synchronous clock domain and generates a pointer stable in a time window in which the address portion may be crossed over into request logic to initiate a read command of a memory.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
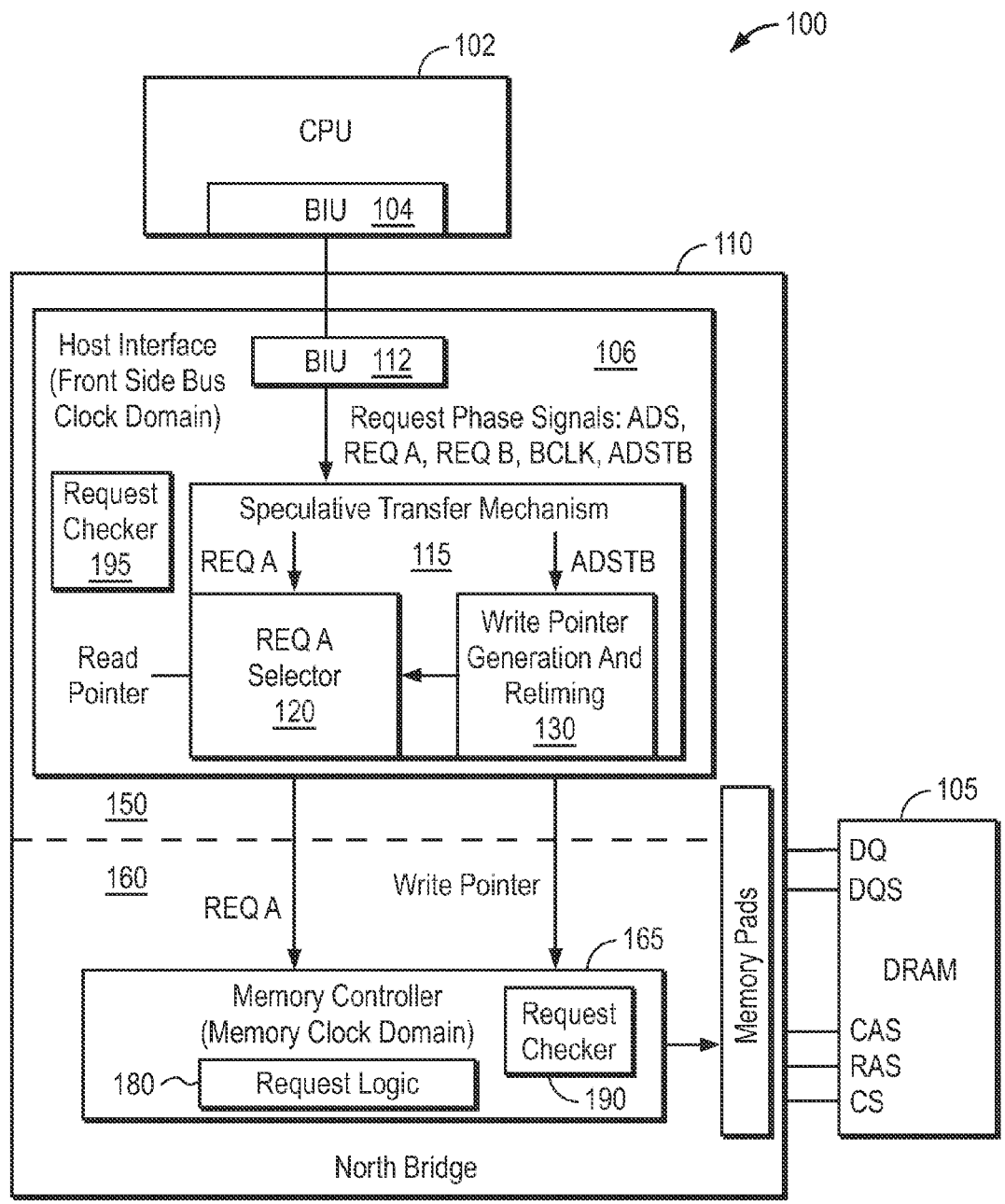
FIG. 1 is a block diagram of a system controller for implementing the function of a North Bridge with speculative transfer of read requests between clock domains in accordance with one embodiment of the present invention.

FIG. 1 illustrates a system 100 in accordance with one embodiment of the present invention. A system controller 110 interfaces a central processing unit 102 and a memory 105. System controller 110 may, for example, be implemented as a North Bridge chip.

CPU 102 issues memory requests to system controller 110 utilizing a source synchronous bus protocol. CPU 102 includes a first bus interface unit (BIU) 104 whereas system controller 110 includes a second BIU 112 disposed in a host interface 106. The request phase for a particular request includes a number of signals determined by the bus protocol that is used. For the source synchronous front side bus (FSB) protocol utilized with Pentium 4 processors, the request phase signals include an address strobe (ADS) for validating a transaction address and request command; REQ A and REQ B address packets corresponding to the two address subphases for transmitting an address and address transaction type information, respectively, in different portions of a bus clock (BCLK) period; and ADSTB# latching signals for source synchronous latching of the REQ A and REQ B address packets, where the REQ A is latched on a falling edge of an ADSTB# and the REQ B is latched on the rising edge of an ADSTB#.

Host interface 106 may include a conventional mechanism (not shown) to handover a full set of request phase signals from the clock domain of host interface 106 to the memory clock domain 160 associated with memory controller 165. This permits a conventional mode of operation in which the REQ A, REQ B, ADS, and ADSTB# signals are re-synchronized into the FSB clock domain and synchronized into memory clock domain 160 and handed over to memory controller 165.

A speculative transfer module 115 is disposed in a ladder clock domain. Speculative transfer module 115 permits a mode of operation in which read requests are rapidly transferred from the clock domain 150 of the host interface 106 to the memory clock domain of a memory controller 165. In one embodiment, only the REQ A signal corresponding to an address and the corresponding ADSTB# latching signal are required by speculative transfer module 115 to transfer a read request to request logic 180 in memory controller 165. Since the REQ A and first ADSTB# latching signal are the earliest signals of a FSB read request, the present invention permits a significant improvement in transfer speed.

Transfer module 115 is speculative in that it does not require the ADS validation signal to transfer a memory request. In some embodiments, additional validation is performed after the full address packet has been received and qualified by ADS, such as in a checker module 190 in the memory controller 165 or in a checker module 195 in the host interface.

Transfer module 115 is also speculative in that it does not require the second address subphase corresponding to the REQ B transaction type packet. The REQ B packet has information that may influence certain types of memory cycles. For example, the REQ B packet typically includes information defining a length, such as a line cycle or a partial cycle. Additionally, the REQ B packet may include a system management mode (SMM) bit. System controller 110 is designed to not require REQ B information in a fast read mode of operation. For example, in one embodiment system controller 110 is designed to run all CPU reads as a full cache line such that in the request stage it is irrelevant whether the length corresponds to a line cycle or a partial cycle. For SMM requests, there are several possible options, such as denying fast read requests to SMM memory or permitting a fast read to SMM memory but taking action after the read request is transferred, such as canceling the read request after the full information becomes available on the data return path.

In one embodiment, speculative transfer module 115 includes a REQ A selector 120 and write pointer generator 130 that act as a cross-over mechanism to pass the REQ A information from the bus protocol clock domain 150 into a memory clock domain 160 associated with a memory controller interface 165. The memory controller 165 receives the REQ A information along with a write pointer. The REQ A demand request may be a synchronous request passed through a conventional path. The write pointer is synchronized into the memory clock domain and indicates to memory controller 165 that a new request is ready. As described below in more detail, in one embodiment the write pointer assures crossover timing. In one embodiment the write pointer is timed/retimed and kept stable over a time window in which the address portion may be crossed over into the memory domain clock edge (e.g., the write pointer may be used to identify a safe memory domain clock edge for the crossover).

A ladder clock (not shown) and associated phase locked loop (PLL) shifts out values for a mask. The ladder clock is the fastest clock in the system and has a fixed relationship to both a BCLK and to a DRAM memory domain clock (dramclk). The ladder clock may, for example, operate at an integer multiple of a front side bus clock.

Figure 2:
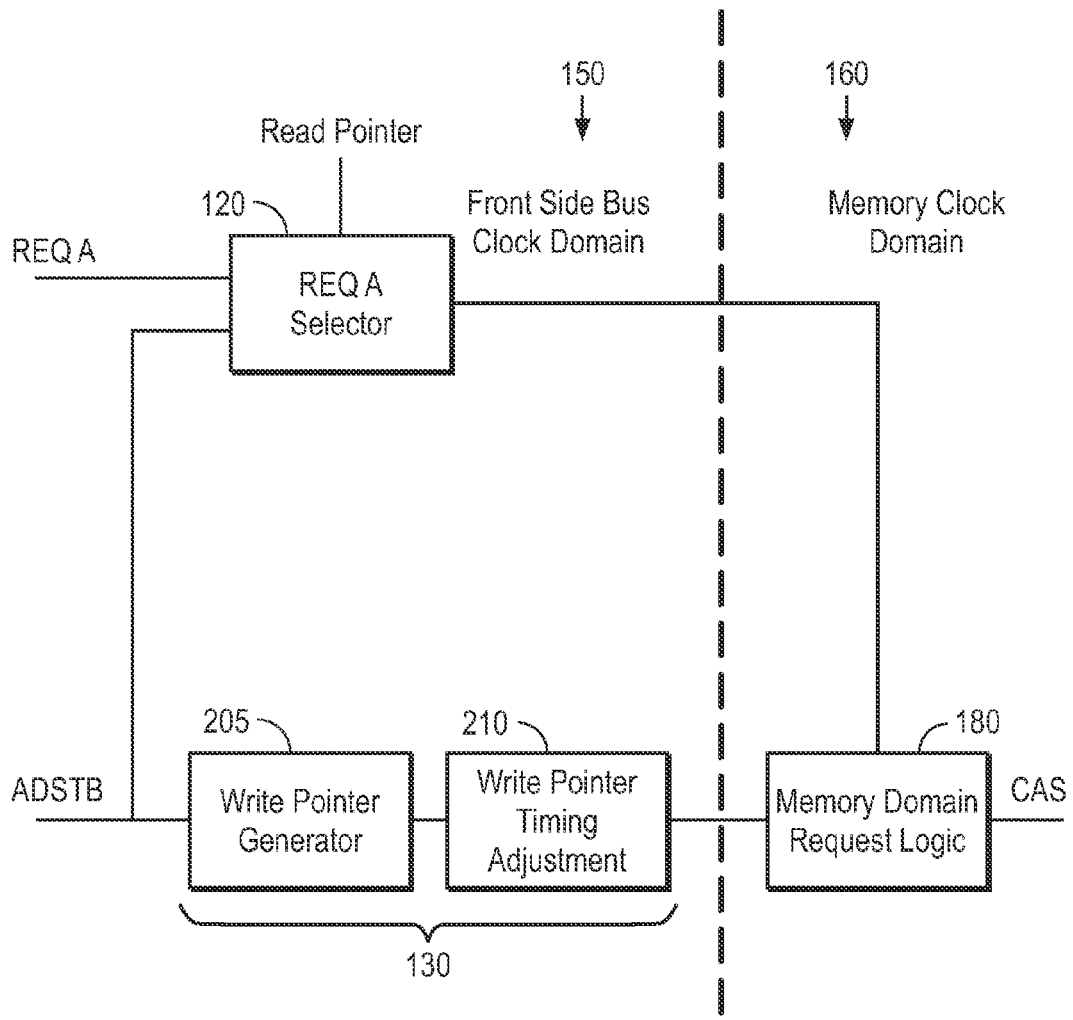
FIG. 2 illustrates an embodiment of a speculative transfer module for transferring read requests between two clock domains in accordance with one embodiment of the present invention.

FIG. 2 is a block diagram illustrating in more detail some aspects of one embodiment of the system controller of FIG. 1. REQ A selector 120 receives the REQ A signal and the ADSTB latching signal. REQ A selector 120 may further receive a read pointer control signal. If the ADSTB# latch signal is detected and the read pointer is enabled, the REQ A signal is latched and the write pointer is incremented and passed into the memory clock domain 160. Thus, the memory clock domain can read the REQ A packet from source synchronous latches after detecting a change to the state of the write pointer.

Write pointer generator 130 has a first module 205 that generates a write pointer in response to detecting the edge of the ADSTB signal that latches the REQ A signal. In one implementation, write pointer timing adjustment module 210 adjusts the timing of the write pointer signal presenting to the destination domain sequential values shifted by different numbers of ladder clocks. The sequence of sequential values is selected to keep the write pointer stable in the destination clock domain for a time required for destination logic to process and latch changes to the writer pointer. The amount of shifting that is performed is selected such that the retimed write pointer that is passed into the memory clock may be used to limit the crossover to a small number of clock edges in the memory clock domain that can accept the REQ A signal. For example, the retimed write pointer may be adjusted to define a time window that eliminates a memory clock edge that would be either too early or too late in time for a safe crossover. The write pointer is kept stable for a sufficiently long period of time before and after a destination clock edge to satisfy timing requirements in the memory clock domain.

The timing window defined by the retimed write pointer preferably permits a crossover at the earliest possible memory clock edge for which the crossover may be safely performed. In one embodiment, additional masking logic (not shown in FIG. 2) in memory domain request logic 180 may be used by memory controller 165 to further limit the timing window in which a crossover may occur.

The degree of timing adjustment performed in timing adjustment module 210 can be selected based on empirical measurements. In one embodiment, system controller 110 includes checking modules 190 and 195, which are disposed in at least one of the clock domains. Checking modules 190 and 195 may be used to check that the address packet that has been transferred is valid or to compare the REQ A address with a "safe address" passed through the conventional request path. Additionally, checking modules 190 and 195 may be used to select the degree of retiming that safely minimizes read request delay. For example, a checking algorithm may empirically adjust the timing window to determine an optimum time window that safely returns valid data.

Figure 3:
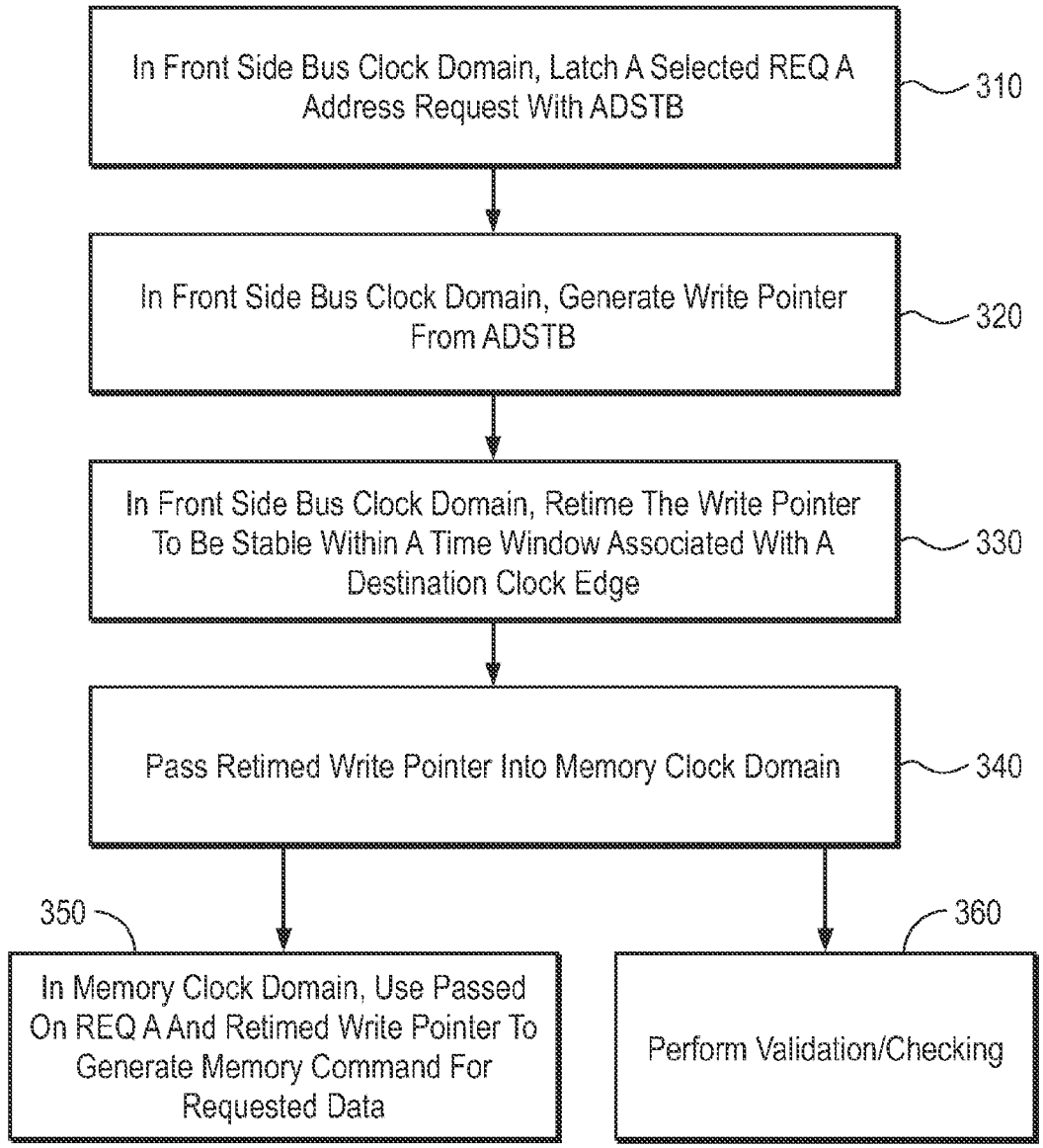
FIG. 3 is a flow chart of a method of speculative transfer of read requests according to one embodiment of the present invention.

FIG. 3 is a flow chart of a method of performing a fast read request in accordance with one embodiment of the present invention. In the bus clock domain, a selected REQ A is latched 310 into the memory clock domain when the ADSTB# latching signal is detected. An initial write pointer is generated 320 in response to detecting the ADSTB# latching signal. The initial write pointer is retimed 330 to satisfy a time window for the memory domain to identify where a crossover can occur. The retimed write pointer is then passed 340 into the memory clock domain. In the memory clock domain a memory command for the read request is generated 350 based on the information in the passed on REQ A. As a result, data is requested for the read command. In some embodiments, the address is checked 360 after it returns to validate the speculative read request.

Figure 4:
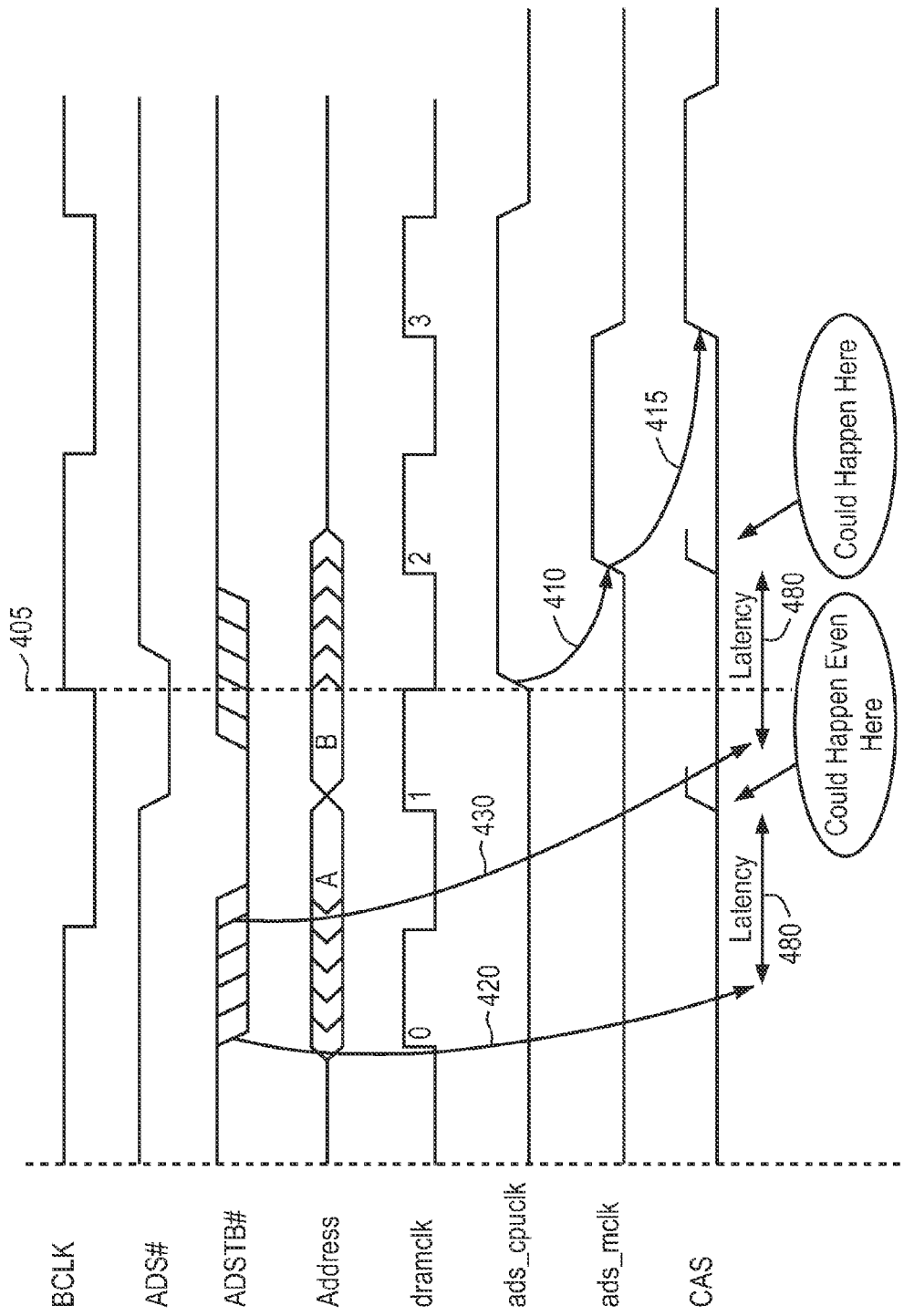
FIG. 4 shows timing signals indicating some of the benefits of speculative transfer of read requests in accordance with one embodiment of the present invention.

FIG. 4 illustrates some of the benefits of the present invention compared with conventional techniques to pass memory requests between clock domains. Conventional North Bridge chips typically perform a synchronous (or pseudo-synchronous) handover of REQ A (Address packet A), REQ B (address packet B) packets, on the ADS# signal. In the memory clock domain actions are initiated in response to a rising clock edge. As illustrated by dashed line 405, in a conventional approach an ADS signal, such as ads_cpuclk, is generated in the bus clock domain in response to the ADS signal. The ads_cpuclk is synchronized into the memory clock domain to generate the ads_mclk signal. Consequently, there is a synchronization delay before the ADS signal enters the memory clock domain at memory clock edge 2 as an ads_mclk signal, as indicated by arrow 410, which illustrates a delay for an optimal BCLK 2 dramclk transfer. Conventionally, read commands are not asserted by the memory controller until the ads_mclk validation signal appears. There is an additional memory controller DRAM control logic latency (e.g., 1 memory clock), as indicated by arrow 415 before a CAS signal is generated at memory clock edge 3 for a read command. Thus, in a conventional implementation, the read command would not begin until memory clock edge 3.

The present invention permits a significant reduction in the read request delay compared with the conventional approach of re-synchronizing the ADS signal into the memory clock domain. As can be seen in FIG. 4, the ADSTB# strobe latching signal for the "A" packet (REQ A) has a falling edge that occurs at clock edge 0. The write pointer is generated in response to the falling edge. The write pointer and REQ A information may then crossover at a memory clock edge within a timing window satisfactory for a timing budget. In this example, the crossover may occur at memory clock edge 1, as indicated by arrow 430, resulting in the generation of a CAS signal at memory clock edge 2. However, if the logic for generating the write pointer is sufficiently fast, the crossover could occur as early as memory clock 0 as indicated by arrow 420, resulting in the generation of a CAS signal at memory clock edge 1. Thus in this example, speculative transfer module 115 reduces read request delay by one or two clocks compared with a conventional approach of resynchronizing the REQ A, REQ B, on the ADS# signals into the memory clock domain and triggering the read on the ads_mclk signal.

Figure 5:
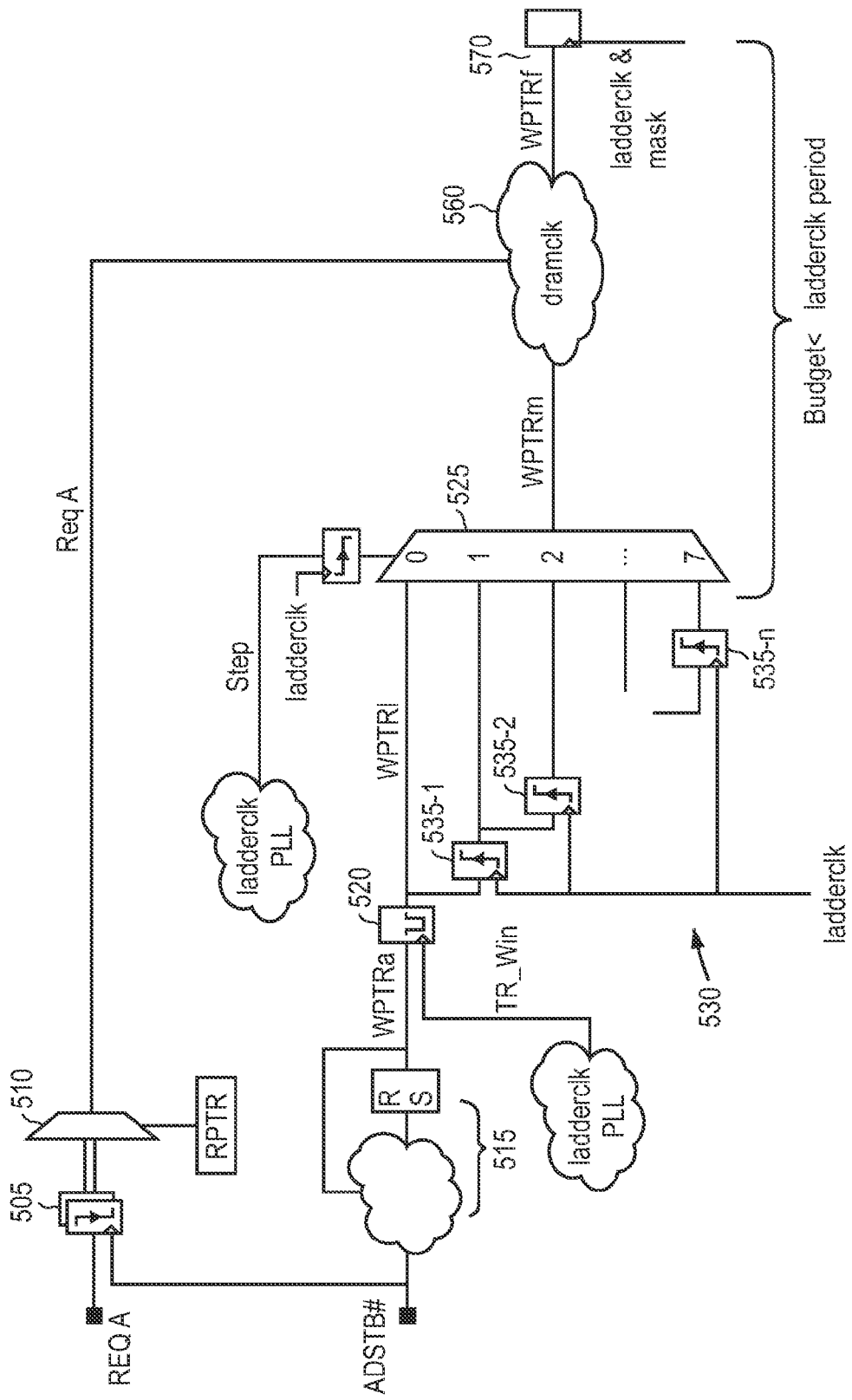
FIG. 5 is a block diagram of a circuit for implementing a speculative transfer module in accordance with one embodiment of the present invention.

FIG. 5 is a block diagram of one embodiment of a speculative transfer module. The REQ A signal is latched into a first in, first out (FIFO) buffer 505 by the ADSTB# signal. In this example, there may be more than one entry in FIFO 505. A multiplexer 510 permits an individual REQ A to be selected by a read pointer (RPTR) signal. This permits the REQ A to be passed into memory clock domain 560, illustrated as the "dramclk" cloud.

Toggle circuit 515 uses the ADSTB# strobe latching signal to generate an initial write pointer, WPTRa, to indicate that data is coming. The WPTRa is latched with a signal TR_Win in latch 520. The signal TR_Win has a length corresponding to one clock length, where in one embodiment the TR_Win has a length corresponding to a clock at a ladder clock rate. For a REQ A signal, the ADSTB# provides latching information on its falling edge. Consequently, the TR_Win signal is selected to set a point where it is certain that an ADSTB# falling edge will pass through latch 520. Latch 520 and the TR_Win signal are preferably selected to prevent passing transient WPTRa signals.

The output of latch 520 is WPTRI, which is a write pointer signal with transients removed. The WPTRI signal is input to multiplexer 525 as a first step "0" in a ladder circuit 530 that has steps coupled to respective inputs of multiplexer 525. Multiplexer 525 may be implemented as a conventional multiplexer. However, in one embodiment multiplexer 525 is a glitch free multiplexer that holds a stable output during transition periods of its input signals (i.e., no glitches in its output during the transient time interval that a new signal is asserted on a multiplexer input or the selector, thus allowing more programming flexibility'). Ladder circuit 530 comprises a sequence of flip flops, such as flip flops 535-1, 535-2, ... 535-n. Each flip flop 535 has one input that is the output of the previous step of the ladder circuit and is toggled by the ladder clock. With each ladder clock pulse the WPTRI signal generated at some initial time at the first step of the ladder falls down the ladder. Thus, for example, step 0 of multiplexer 525 represent the WPTRI signal at some initial time, step 1 represents WPTRI shifted by one clock, step 2 represents WPTRI shifted by two clocks, and so on.

The selection signal for multiplexer 525 is a clocked version of a step signal. The step signal selects one or more of the steps from the ladder circuit 530 to be multiplexed as the output. As a result, the step signal controls the timing of WPTRm, which can be shifted out in time, depending upon the step signal that is applied to multiplexer 525.

Write pointer WPTRf reflects any timing modifications of WPTRm created by ladder logic (not shown). The WPTRf write pointer is preferably input to logic 570 that permits a mask signal to be applied to cut off a dramclk edge for situations where it would be undesirable to accept a new write pointer.

The step signal may be optimized using a variety of techniques. In one embodiment, the steps are selected using an algorithm which tests different step signals and identifies a step sequence that results in a minimum read request delay without failing a validation check in one of the checker modules 190 and 195. Additionally, the step signal may be selected to have different default modes, depending upon the bus clock rate and the memory domain clock rate. In some embodiments, a default step signal is programmed for particular combinations of bus clock rate and memory domain clock rate. These default rates may be further empirically validated and adjusted to optimize performance or in response to detecting an error.

Figure 6:
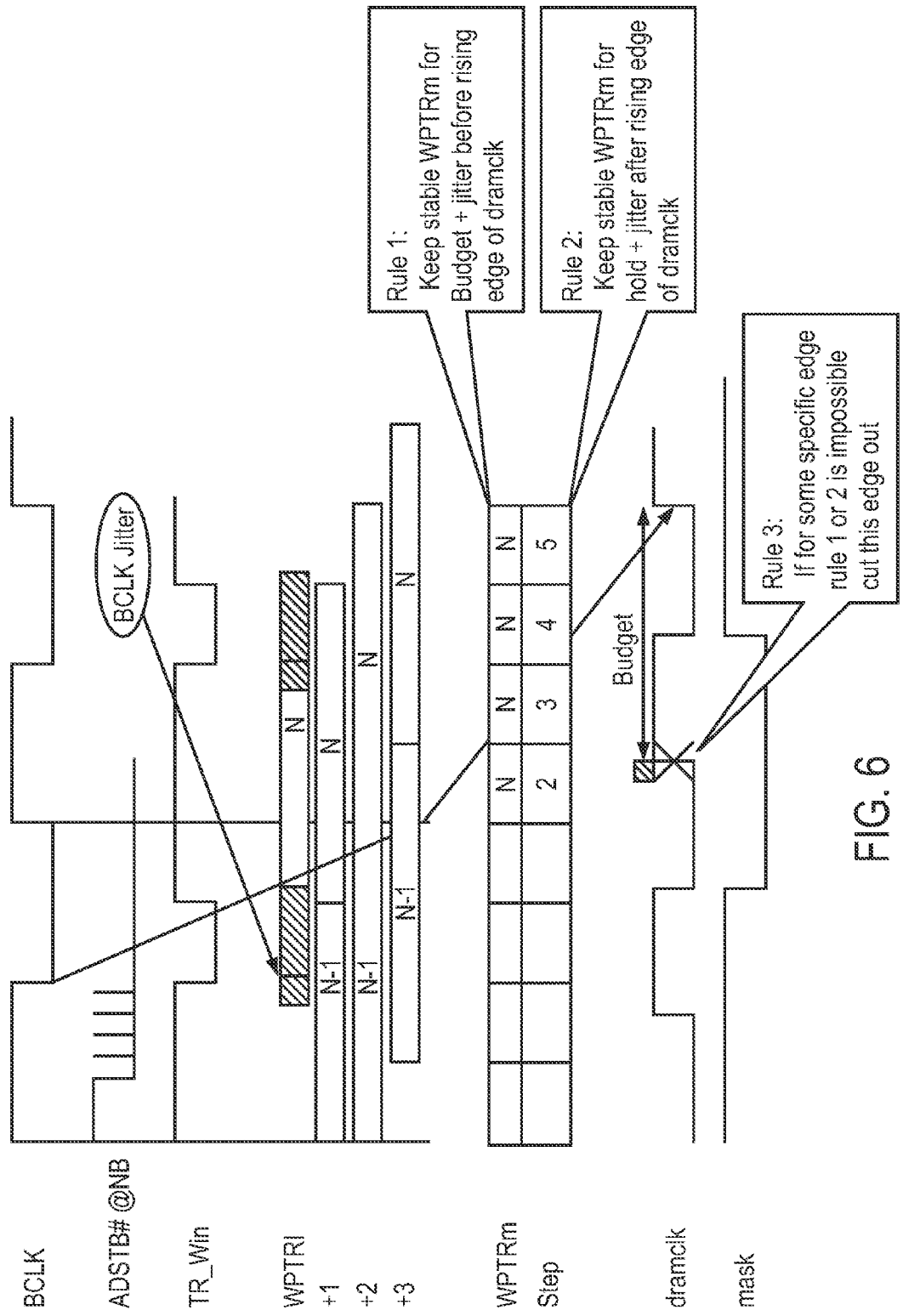
FIG. 6 illustrates some of the rules that may be applied in the speculative transfer module of FIG. 5 to achieve a stable write pointer on an appropriate clock edge in the memory clock domain in accordance with one embodiment of the present invention.

FIG. 6 illustrates some of the issues involved in designing the circuit of FIG. 5 to handle jitter and timing budgets for the write pointer and mask signals. In one embodiment, several rules are applied to facilitate performance in light of timing budgets and jitter effects. The relevant signals are shown for one example and include a bus clock (BCLK), ADSTB#, TR_Win, a sequence of WPTRI signals (corresponding to the WPTRI at the top step of the ladder and at several subsequent time shifted steps), WPTRm signal (for particular steps), memory clock (dramclk), and the mask signal. The TR_Win signal is preferably selected to facilitate achieving a stable WPTRm within a dramclk window defined by timing budget and jitter effects. As can be seen in FIG. 6, the initial WPTRI has an associated BCLK jitter. A first rule that may be applied is that the WPTRm should be kept stable for a time period before the rising edge of the dramclk corresponding to the timing budget+jitter. This rule may be implemented by controlling the step sequence. A second rule that may be applied is that WPTRm should be kept stable after the rising edge of dramclk for a time period corresponding to a hold time+jitter. The timing flow and design synthesis should be designed to account for hold time and jitter requirements. A third rule, implemented by the mask signal, is to cut out edges that would fail to satisfy the stability requirements of the first and second rules. For example, the mask timing profile could be selected by empirically varying the mask profile or by performing a timing analysis to determine the timing budget and jitter for a particular implementation. It will be understood that the TR_Win signal and the mask signal may also have default values for different combinations of bus clock rates and memory domain clock rates. Criteria may be programmed for varying these default values, such as detecting an error or excessive read request delay. For example, empirical optimization of these signals may be performed using an algorithm that varies these signals and optimizes them to reduce read request delay without introducing a deleterious level of errors.

Figure 7:
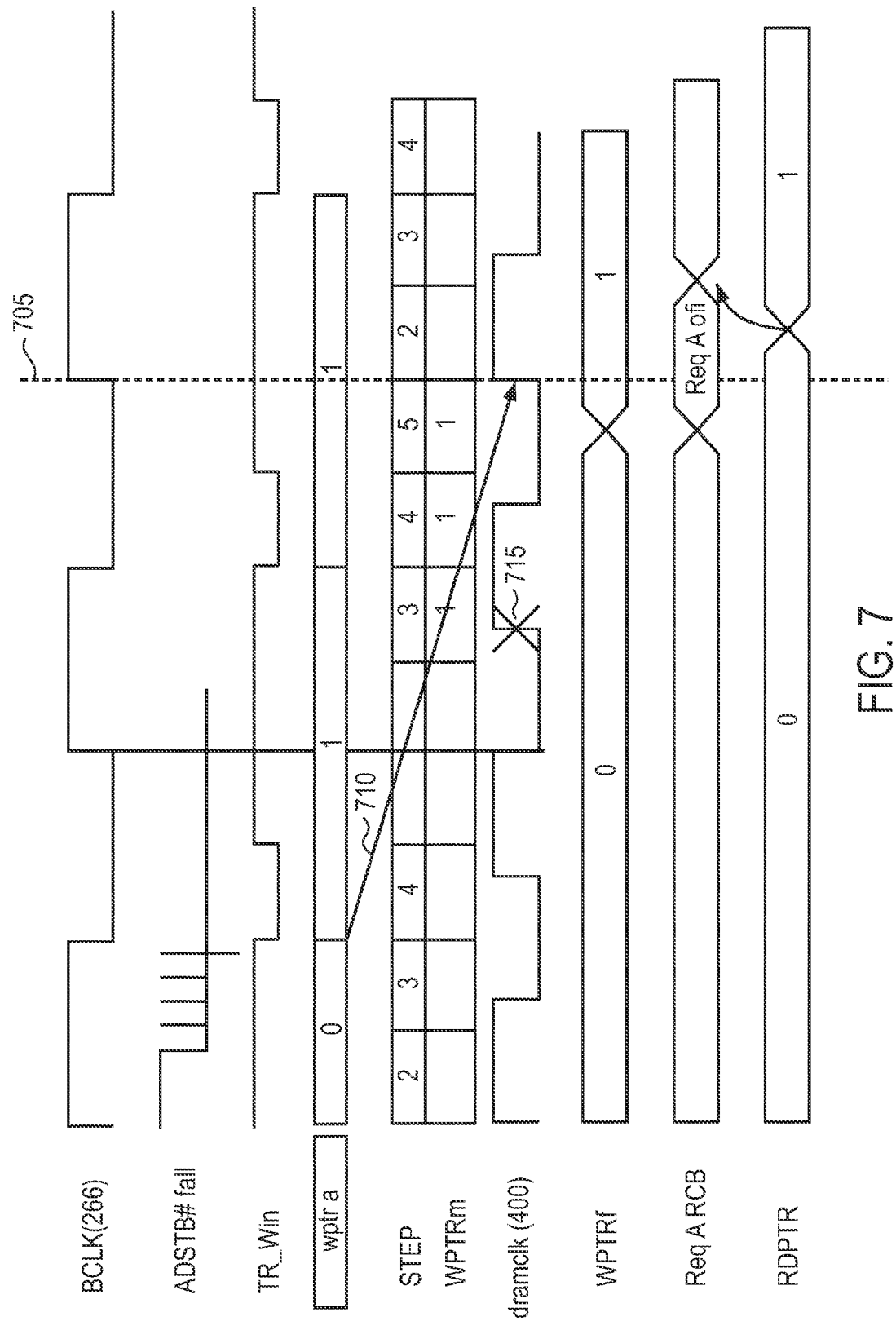
FIG. 7 illustrates exemplary signals for the speculative transfer module of FIG. 5.

FIG. 7 illustrates an exemplary sequence of signals for a read request in the circuit of FIG. 5. When the ADSTB# signal reaches a falling edge, the initial write pointer WPTRa is advanced to a value of "1." WPTRa is latched on the low side of TR_Win to generate WPTRI (not shown) and is shifted through the ladder circuit to the dramclk edge 705 as indicated by arrow 710. WPTRf thus is advanced to 1 at clock edge 705 and the dramclk logic issues a request (Req A RCB) to the next dramclk stage, latches the address, and advances a read pointer to the next value. In this example, clock edge 715 indicates a dramclk edge that is masked off for jitter considerations, hold time, or other reasons, as described above.

Figure 8:
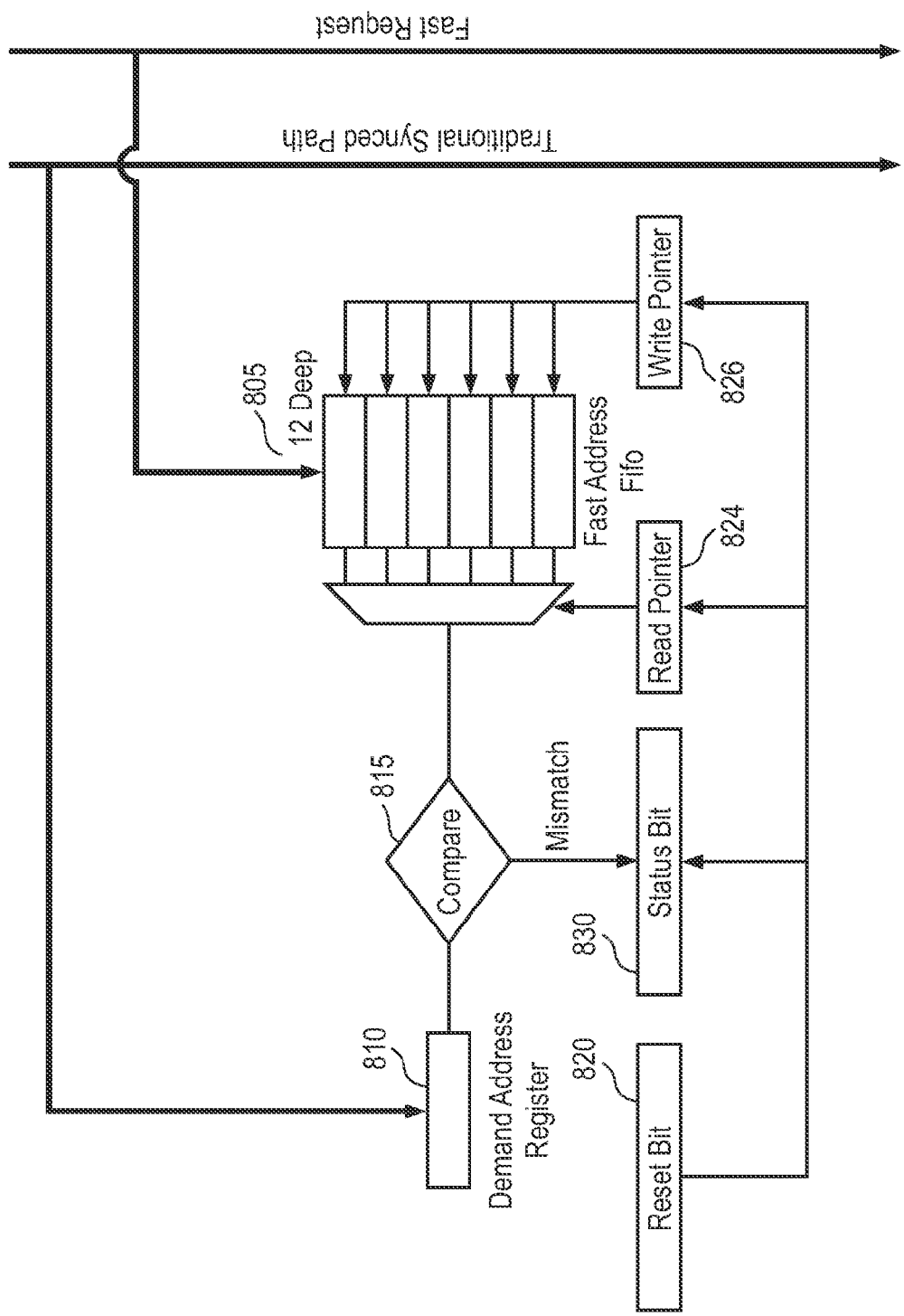
FIG. 8 illustrates a checker module to check the validity of a fast read request in accordance with one embodiment of the present invention.

FIG. 8 is a diagram of a checker module 190 or 195 according to one embodiment of the present invention. A fast address FIFO 805 receives fast read request addresses. A traditional synchronized path 810 receives the address of new demand reads. A reset register 820, read pointer register 824, and write pointer register 826 permits control of FIFO 805. A comparator 815 makes a comparison. If the comparator 815 detects a mismatch, it records it in status register 830 as a sticky bit. Status register 830 may be read by management software, thereby permitting management software an opportunity to detect that an error occurred in making a fast read request.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. An apparatus for speculatively transferring a read request from a first clock domain to a second clock domain, said read request being compliant with a source synchronous read request protocol providing that said read request includes an address portion representing an address and an address strobe latching signal having a latching edge for latching said address portion and an address strobe occurring later in time than said address portion and said address strobe latching signal, said address strobe providing an indication of the validity of the read request, the apparatus comprising:

a latch configured to latch said address portion from said first clock domain into said second clock domain in response to said latching edge of said address strobe latching signal;

a pointer generator in said first clock domain to generate a write pointer in response to detecting said latching edge of said address strobe latching signal, said write pointer indicative of said read request and a safe clock edge in the second clock domain for crossing over said address portion into said second clock domain within a time window defined by a timing budget and jitter effects and adjusted by a checking module to select a safe time to return valid data; and request logic in said second clock domain configured to generate a read command to a memory responsive to said address portion and said write pointer;

wherein said apparatus includes a first mode of operation to transfer said read request speculatively without validating said read request prior to synchronizing the read request into the second clock domain and prior to transferring the read request from the first clock domain to the second clock domain, said apparatus is configured to validate said read request subsequent to generating said read command; and wherein said apparatus includes a second mode of operation to transfer said read request from said first clock domain to said second clock domain subsequent to validating said read request.

2. The apparatus of claim 1, wherein said request logic selects a clock edge for said crossover which is the earliest safe clock edge for which said crossover may be safely performed.

3. The apparatus of claim 1, wherein said pointer generator generates an initial pointer in response to detecting said latching edge of said address strobe latching signal, said pointer generator adjusting the timing of said initial pointer to generate said write pointer.

4. The apparatus of claim 3, wherein said pointer generator comprises:
a glitch-free multiplexer;
a ladder circuit having a plurality of steps coupled to inputs of said multiplexer, said ladder circuit having an initial step receiving said initial pointer, with each subsequent step of said ladder circuit shifting said initial pointer by one clock with respect to a preceding step; and
selection logic for providing a selector signal to said multiplexer, whereby selected steps of said ladder circuit are output by said multiplexer.

5. The apparatus of claim 1, further including: at least one checker to validate speculative read requests subsequent to generation of associated read commands.

6. The apparatus of claim 1, further comprising: masking logic coupled to said request logic to filter undesirable clock edges in said time window.

7. The apparatus of claim 1, wherein said read request protocol includes an address strobe that is asserted subsequent to said address portion and said address strobe latching signal, said address strobe indicating the validity of said address portion, said apparatus speculatively generating said write pointer without requiring said address strobe.

8. An apparatus for transferring a read request from a first clock domain associated with a bus interface to a second clock domain associated with a memory controller, said bus interface having a source synchronous bus protocol providing that the read request includes an address portion representing an address, an address strobe occurring later in time than said address portion to indicate the validity of a transaction address, and an address strobe latching signal having a latching edge for latching said address portion, said address strobe latching signal occurring earlier in time than said address strobe, the apparatus comprising:
a selector for selecting a particular read request, said selector passing said address portion of said particular read request from said first clock domain into said second clock domain in response to detecting said address strobe latching signal;
a pointer generator to generate a write pointer in response to detecting said latching edge of said address strobe latching signal, said write pointer indicative of said read request and a safe clock edge in the second clock domain for crossing over said address portion into said second clock domain within a time window defined by a timing budget and jitter effects and adjusted by a checking module to select a safe time to return valid data; and a memory controller in said second clock domain to generate a read command responsive to said address portion and said write pointer;
wherein said apparatus includes a first mode of operation to transfer said read request speculatively without validating said read request prior to synchronizing the read request into the second clock domain and prior to transferring the read request from the first clock domain to the second clock domain; and
wherein said apparatus includes a second mode of operation to transfer said read request from said first clock domain to said second clock domain subsequent to validating said read request.

9. The apparatus of claim 8, wherein said pointer generator generates an initial pointer in response to detecting said clock edge of said address strobe latching signal and adjusts the timing of the initial pointer to generate said write pointer.

10. The apparatus of claim 9, wherein said pointer generator comprises:
a glitch-free multiplexer;
a ladder circuit having a plurality of steps coupled to inputs of said multiplexer, said ladder circuit having a first step receiving said initial pointer, with each subsequent step of said ladder shifting said initial pointer by one clock with respect to a preceding stage; and
selection logic for providing a selector signal to said multiplexer, whereby selected steps of said ladder circuit are output by said multiplexer.

11. The apparatus of claim 8, further including: at least one checker to validate speculative read requests subsequent to generation of associated read commands.

12. The apparatus of claim 8, further comprising: masking logic in said memory controller to filter undesirable clock edges.

13. A method of transferring a source synchronous read request from a first clock domain into a second clock domain, comprising:
latching an address portion of said read request from said first clock domain into said second clock domain in response to receiving said address portion and a latching signal for said address portion;
in said first clock domain, generating a write pointer in response to receiving said latching signal, said write pointer indicative of said read request and a safe clock edge in the second clock domain for crossing over said address portion into said second clock domain within a time window defined by a timing budget and jitter effects and adjusted by a checking module to select a safe time to return valid data; and
in said second clock domain, generating a read command in said second clock domain for said address portion on a clock edge indicated by said write pointer;
wherein, in a first mode of operation, said read request is transferred speculatively without validating said read request prior to synchronizing the read request into the second clock domain and prior to transferring the read request from the first clock domain to the second clock domain; and
wherein, in a second mode of operation, said read request is transferred from said first clock domain to said second clock domain subsequent to validating said read request, and further comprising:
in said first mode of operation, checking the validity of said read command after said read command has been generated.

14. The method of claim 13, wherein said generating a write pointer comprises: generating an initial pointer in response to detecting said latching signal and adjusting the timing of said initial pointer.

15. The method of claim 14, further comprising: determining a degree of retiming of said initial pointer to encompass an earliest safe memory clock edge for which a safe crossover may be achieved.

16. A system, comprising:
- a bus interface unit to receive read requests from a central processing unit according to a source synchronous bus protocol, the protocol specifying that each read request includes a sequence of signals including an address portion specifying an address, an address strobe validating said address portion, and an address strobe latching signal including a latching edge for latching said address portion, said address strobe occurring later in time than said address portion and said address strobe latching signal, said address strobe providing an indication of the validity of each read request; and
- a transfer module configured to transfer said read request from a source clock domain associated with said bus interface unit to a destination clock domain associated with a memory controller;
- said transfer module latching said address portion into said destination clock domain and generating a write pointer indicative of said read request and a safe clock edge in the destination clock domain in which said address portion may be crossed over into request logic within a time window defined by a timing budget and jitter effects and adjusted by a checking module to select a safe time to return valid data and initiate a read command of a memory;
  - wherein said system includes a first mode of operation to transfer said read request speculatively without requiring validating said read request prior to synchronizing the read request into the destination clock domain and prior to transferring the read request from the source clock domain to the destination clock domain; and
  - wherein said system includes a second mode of operation to transfer said read request from the source clock domain to the destination clock domain subsequent to validating said read request.

17. The system of claim 16, further comprising: a memory controller, said memory controller generating said read command based on said write pointer and said address portion.

18. A method for transferring read requests between clock domains, comprising:
- in a bus interface unit clock domain, receiving a read request having an address portion associated with address information, an address strobe occurring proximate an end of said address portion for validating an address transaction, and an address strobe latching signal having a latching edge for latching said address portion;
- transferring said address portion into a memory clock domain; and
- generating a write pointer indicative of said read request and a safe clock edge in the destination clock domain in which said address portion may be crossed over into said memory clock domain within a time window defined by a timing budget and jitter effects and adjusted by a checking module to select a safe time to return valid data; and
- passing said write pointer into said memory clock domain;
  - wherein, in a first mode of operation, said read request is transferred speculatively without validating said read request prior to synchronizing the read request into the memory clock domain and prior to transferring the read request from the bus interface clock domain into the memory clock domain; and
  - wherein, in a second mode of operation, said read request is transferred from said bus interface clock domain into said memory clock domain subsequent to validating said read request, and further comprising:
- in said first mode of operation, validating said read request subsequent to transferring said read request from the bus interface clock domain into the memory clock domain.

19. A memory controller for implementing a read request received by a host interface via a source synchronous bus protocol, said memory controller comprising:
- request logic for receiving an address portion of a read request and a write pointer indicative of said read request and a safe clock edge in a destination clock domain indicative of when said address portion may be crossed over from a source clock domain to the destination clock domain within a time window defined by a timing budget and jitter effects and adjusted by a checking module to select a safe time to return valid data, said request logic initiating a read command in response to said address portion and said write pointer;
- wherein said memory controller includes a first mode of operation to transfer said read request speculatively without validating said read request prior to synchronizing the read request into the destination clock domain and prior to transferring the read request from the source clock domain to the destination clock domain, said memory controller is configured to validate said read request subsequent to initiating said read command; and
- wherein said memory controller includes a second mode of operation to transfer said read request from said source clock domain to said destination clock domain subsequent to validating said read request.

* * * * *